Nov. 29, 1932. G. C. GOODE Re. 18,671
SUPERCHARGER
Original Filed Dec. 29, 1922 2 Sheets-Sheet 1
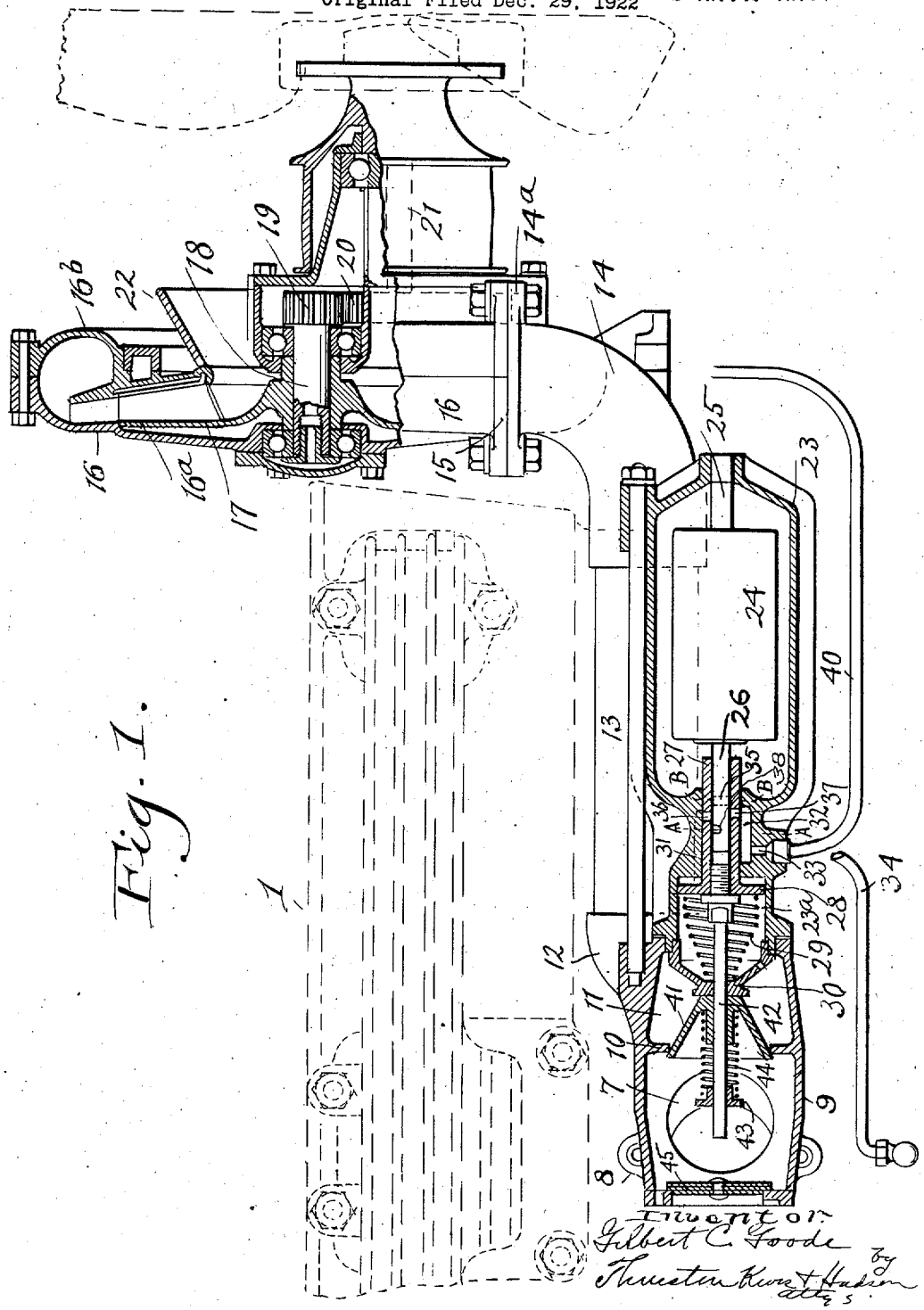

G. C. GOODE
Nov. 29, 1932. SUPERCHARGER Re. 18,671
2 Sheets-Sheet 2
Original Filed Dec. 29, 1922
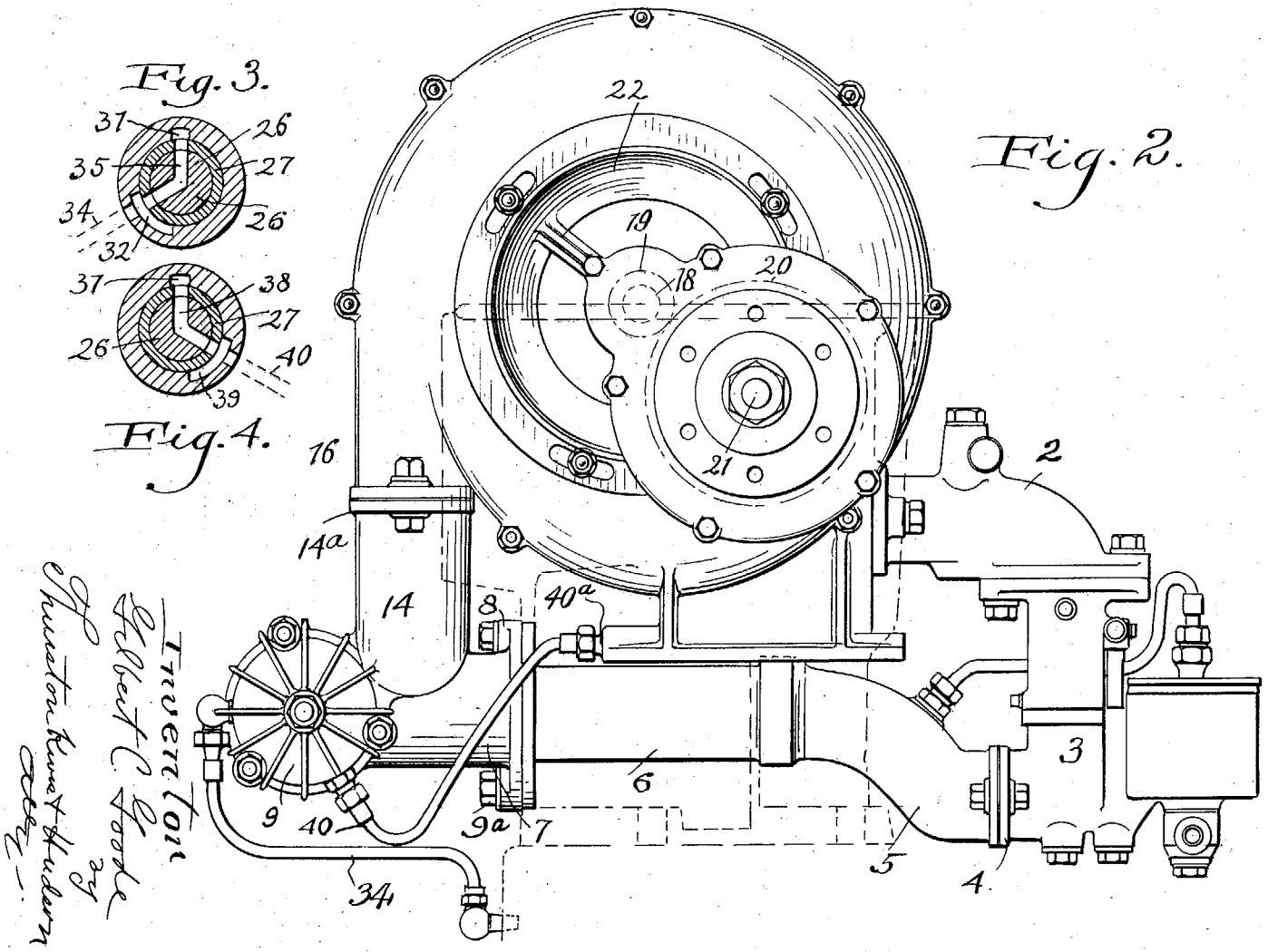

Reissued Nov. 29, 1932

Re. 18,671

UNITED STATES PATENT OFFICE

GILBERT C. GOODE, OF DETROIT, MICHIGAN, ASSIGNOR TO THE WHITE MOTOR COMPANY, OF CLEVELAND, OHIO, A CORPORATION OF OHIO

SUPERCHARGER

Original No. 1,704,082, dated March 5, 1929, Serial No. 609,600, filed December 29, 1922. Application for reissue filed July 20, 1929. Serial No. 380,744.

This invention relates to a device by which the air which is delivered to the carburetor of an internal combustion engine may be controlled to be maintained substantially uniform in the quantity supplied in a given interval of time, regardless of the atmospheric pressure which may vary at different altitudes.

This invention contemplates the provision of means to be used with internal combustion engines, for varying the supply of air delivered thereto in accordance with changes in atmospheric pressure. More particularly, an objective in view is the provision of a source of air under pressure together with means for delivering the air to the engine, and a means for controlling the delivery, mechanism responsive to changes in atmospheric pressure being associated with the controlling means.

In carrying out the foregoing thoughts a conduit is availed of to connect the engine with an air supply means for providing air under pressure greater than that of the atmosphere. A valve device is located in the conduit and motive means for the valve device is associated therewith. An atmospheric responsive mechanism that operates incident to pressure changes controls the operations of the motive means.

The present invention is more particularly designed for use with internal combustion engines which are used on motor vehicles under circumstances where the motor vehicle is used in mountainous country, where, as will be appreciated, the barometric pressure will differ at different altitudes, and will, to a greater or less extent, in accordance with the altitude affect the operation of the internal combustion engine due to the action of the carburetor. A carburetor which is set to operate and does operate satisfactorily at practically coast line conditions will not operate satisfactorily on elevations of several thousand feet.

There are certain parts of the country where vehicles in their travels will in the course of a comparatively short time attain a differential altitude of several thousands of feet, and particularly in such cases it is desirable that the air supply for the carburetor be regulated in accordance with the atmospheric pressure.

Reference should be had to the accompanying drawings forming a part of this specification, in which Fig. 1 is a side elevation of a portion of an internal combustion engine with certain portions in section; Fig. 2 is a front elevation of the device; Fig. 3 is a section on the line A—A of Fig. 1; Fig. 4 is a section on the line B—B of Fig. 1.

Referring to the drawings, the engine cylinder block is indicated at 1 and requires no particular description at this time.

The intake manifold for the engine may be generally represented at 2 in Fig. 2, and the carburetor represented at 3. The air intake portion of the carburetor is indicated at 4 and communicates with a curved pipe 5 which in turn communicates with a straight pipe 6 which extends transversely between adjacent cylinders on an engine block. This pipe communicates with a pipe 7 which has a flange 8 that is secured to a part of the engine block by means of nuts 9*a*. The pipe 7 communicates with a chambered member 9 which chambered member has an inner wall 10 having a large opening, and through the opening in the wall 10 the chamber 9 communicates with a chamber 11. This chamber 11 has extending therefrom an elbow 12 which communicates with a pipe 13. The pipe 13 in turn communicates with a curved pipe 14 which by means of a flange 14*a* is attached to the flanged base 15 of a blower casing 16. The blower casing is mounted upon any suitable portion of the engine, and the blower casing may be described as being formed in two parts, a rear portion 16*a* and a front portion 16*b*, which parts are bolted together. The blower has within it a fan 17 which is mounted upon a shaft 18, this shaft being suitably supported from the casing, preferably by means of ball bearing supports. This fan blade may be of any proper form and dimensions, no invention being claimed in the particular form of fan which is used.

The shaft 18 at its outer end has a gear 19 either formed therewith or attached thereto, and this gear meshes with a gear 20 which in turn is carried upon the fan shaft which is indicated at 21 by dotted lines. The fan shaft of course is a usual construction in motor vehicles.

The casing for the blower fan has a central opening with a flaring mouth portion 22, so that the engine fan which is normally so formed as to throw air in the direction of the flaring member 22 will pass air to the blower and air so received will be forced through the casing 16 and the various pipe connections which have been described to the engine, but will of course be controlled in a manner which is about to be described.

As will be readily apparent, the manifold 2, the carburetor 3, the pipes 5, 6 and 7, the member containing the chambers 9 and 11 and the blower casing 16 form a continuous intake conduit which communicates at one end with the interior of the engine and at the other end with the atmosphere.

Attached to the member 9 is what may be termed an auxiliary casing 23, and within this casing there is a pressure responsive device 24, this device having a part so fashioned that it will expand and contract in accordance with the pressure conditions of the atmosphere. In the present instance an expansible metallic bellows is used, but this description is given without limitation in this respect.

The member 24 is at one end supported by a rod 25 which extends through a suitable opening in the end of the casing 23. At its opposite end the member 24 has secured to the bellows portion thereof a rod 26 which is mounted to freely slide in a sleeve 27 which sleeve at its end has an outwardly flaring flange 28 and this flange is pressed in a given direction by means of a spring 29 which spring at its outer end sets against a cap 30 that is secured to the end portion of the casing 23. The flanged member 28 is of such a size and diameter that it fairly snugly fits within a chamber 23*a* which is formed by a portion of the casing 23 and the cap 30.

The sleeve 27 to which reference has before been made, extends through an opening with which it has a good sliding fit, which opening forms a part of the casing 23. The opening is formed by a reduced neck portion of the casing 23. In the wall and opening into the opening through which the sleeve 27 extends is a groove 31, this groove extending longitudinally with respect to the sleeve 27, and at one end opens into the chamber 23*a* behind the flange 28. Below the sleeve 28 there is formed in the wall a chamber 32 which has a conduit 33 that connects with the pipe 34 which in turn is connected with the lubricating system for the internal combustion engine, which in all modern structures supplies oil under a pressure of approximately 25 pounds per square inch, so that oil in the pipe 34 is under such pressure and will naturally fill the chamber 32 and maintain oil in that chamber under a pressure.

The rod 26 which is connected to the end of the pressure responsive device is as before stated, free to slide in the sleeve 27 under the expansion or contraction of the member 24. This rod has a duct formed therein which is shown at 35 in Figs. 1 and 3. The sleeve 27 is formed with two openings which are opposite each other, these openings being indicated at 36 and 37, and are in communication respectively with the groove 31, and the chamber 32. When the member 24 expands and the rod 26 moves forward the duct 35 will come into communication with the openings 36 and 37, and thereupon oil which is held under pressure in the chamber 32 will pass through the duct 35 into the groove 31 and behind the member 28, and this oil under pressure will force the flange 28 and the sleeve 27, forwardly, against the action of the spring 29, but the distance which the sleeve 27 may move will be controlled because as soon as the openings 36 and 37 move out of registry with respect to the duct 35 which is formed in the rod 26 then the oil supply is shut off and the member 28 will move no further.

There is also another duct formed in the rod 26, this duct being indicated at 38, and is more particularly shown in Fig. 4. This duct is also in communication with the groove 31, and the lower portion of the duct 38 registers with a groove 39 formed in the sleeve 27, and this opening in the sleeve in turn cooperates with an opening that is formed in the casing 23 with which opening there communicates a pipe 40 that has a connection as indicated at 40*a* which delivers oil into the crank case of the engine.

The grooves 38 and 35 are displaced with respect to each other as indicated, and when the bellows recedes it may bring the groove 38 into registry with the groove 36 so that the oil which is within the chamber 23*a* and behind the member 28 may have access to escape, and it will be assisted in its movement by the pressure of the spring 29 against the member 28.

The devices which have just been described are for the purpose of controlling the movement of a valve 41 which cooperates with the opening through the wall 10 which is within the chambered member 9. This valve 41 is preferably conical in shape although not necessarily so, and is mounted to slide freely upon a rod 42 which is at one end fastened to the end of the sleeve 27 and extends through an opening in the cap 30 which thereby serves as a support and guide. This rod 42 at one end has an adjustable member 43 thereon against which one end of a spring 44 presses, while the opposite end of the spring 44 presses against the valve 41 and normally urges it to such a position as to close the opening through the wall 10.

When the member 24 expands and pushes the sleeve 27 forwardly in a manner which has before been explained, the pressure of the spring 44 upon the valve 41 will be lessened due to the fact that the opposite stop member 43 is being moved away from the valve 41. This then will enable the valve 41 to be more readily moved by the air pressure which is within the chamber 11 because, as will be recalled, this chamber is connected with the blower within the casing 16.

It will be understood that under normal working conditions the position and pressure of the springs 44 may be so adjusted as to permit a required amount of air to pass beyond the valve 41 under given conditions of atmospheric pressure, the spring under such conditions being sufficiently stiff to prevent complete opening of the valve 41.

When, however, due to increase in altitude and consequent decrease in atmospheric pressure, the member 24 expands and pushes the rod 42, the pressure of the spring 44 behind the valve 41 is reduced, and consequently the air under pressure within the chamber 11 may act upon the valve 41 to push it to a more open position, and consequently permit the passage of more air to the chamber 9*a*, which, as will be recalled, is connected with the air inlet for the carburetor.

On the reverse condition, when the member 24 contracts it will be apparent that the stop member 43 being moved inwardly will create an increasing effective pressure of the spring 44 on the valve 41 and so move it toward its seat.

It will, therefore, be clear that in the construction which has been described, after a given setting of the device, the same will operate either to supply more air at decreased atmospheric pressure, or supply a diminished amount of air on pressures which are above that atmospheric pressure for which the device is adjusted.

From the foregoing description it will further be seen that the device is entirely automatic, and in mountain climbing or under conditions where runs at various altitudes must be traversed by the vehicle, the quantity of air delivered to the carburetor will be maintained in such relation that the mixture which is supplied to the internal combustion engine will be under proper pressure and provide a proper mix with the fuel for giving the proper results for engine running.

At the end of the casing 9 in which is the chamber 9*a* there is an opening closed by a flap valve 45, which is adapted to provide an auxiliary supply of air to the carburetor when the device which has heretofore been described is not functioning.

Having described my invention, I claim:

1. The combination with a carburetor having an air intake, a source of air under pressure, an air conduit connecting the source of air with said air intake, a spring-pressed valve associated with said conduit, motor means for controlling the effective pressure of the spring upon said valve, and an atmospheric pressure responsive device controlling the functioning of said motor means.

2. The combination with a carburetor having an air intake, a source of air under pressure, an air conduit connecting the said source of air with the said air intake, a valve controlling the passage of air through said conduit, a rod upon which said valve is slidably mounted, a spring member surrounding the rod and bearing against said valve at one end and against an abutment on the rod at the other end, a fluid motor means for moving said rod, and an atmospheric pressure responsive device for controlling the functioning of said fluid motor means.

3. The combination with a carburetor having an air intake, a source of air under pressure, an air conduit connecting the said source of air with the said air intake, a valve controlling the passage of air through said conduit, a rod upon which said valve is slidably mounted, a spring member surrounding the rod and bearing against the said valve at one end and against an abutment on the rod at the other end, a piston member connected with said rod, a casing member in which the piston operates, a spring normally urging the piston in one direction, a source of fluid under pressure, valvular means for controlling the delivery of fluid under pressure behind the said piston, and an atmospheric pressure responsive device controlling the functioning of said valvular means.

4. The combination with a carburetor having an air intake, a spring-pressed valve associated with said intake and controlling the passage of air thereto, actuating means for adjusting the spring tension on said valve, a device associated with said actuating means and responsive to variations in atmospheric pressure said device including a member whose movements are independent of said actuating means, and means for controlling the operation of said actuating means.

5. The combination with a carburetor having an air intake, a spring-pressed valve controlling said intake, actuating means for adjusting the tension on said valve, a device responsive to variations in atmospheric pressure and including a member whose movements are independent of said actuating means, and means for causing movements of the actuating means corresponding to movements of said member.

6. The combination with a carburetor having an air intake, a blower fan, a casing surrounding the blower fan, an air conducting conduit connected with said casing and also connected with the air intake, a chamber forming a part of said conduit, a valve controlling the passage of air through said chamber, a movable member to which the valve is yieldably connected, fluid operated means for actuating the member, an atmospheric pressure responsive device, and means operated by the pressure responsive device for imparting movements to the actuating means substantially proportional to variations in atmospheric pressure.

7. The combination with a carburetor having an air intake, a source of air under pressure, an air conduit connecting the source of air with the air intake, a spring-pressed valve controlling the passage of air through said conduit, a movable member for controlling the effective pressure of said spring upon the valve, fluid operated means for actuating said movable member, an atmospheric pressure responsive device, and means operated by said device for controlling the operation of said actuating means.

8. The combination with an internal combustion engine, of an air intake conduit including a chamber communicating with said engine, mechanism for propelling air into said chamber, and atmospheric pressure responsive means operable to maintain the air pressure in said chamber substantially constant irrespective of variations in atmospheric pressure, and means to maintain said pressure constant irrespective of the speed of operation of said mechanism.

9. The combination with an internal combustion engine, of an air intake conduit including a chamber communicating with said engine, mechanism for propelling air into said chamber, and means operable to maintain the air pressure in said chamber substantially constant, irrespective of the speed of operation of said mechanism or variations in atmospheric pressure.

10. The combination with an internal combustion engine, of an air intake conduit, means for propelling air therethrough, means responsive to changes in atmospheric pressure and independent of the pressure in said conduit for varying the flow resistance of said conduit, and means for varying the flow resistance of said conduit according to the speed of said engine.

11. The combination with an internal combustion engine, of an air intake conduit, mechanism driven by said engine at a constant relative speed for propelling air through said conduit, means responsive to changes in atmospheric pressure and independent of the pressure in said conduit for varying the flow resistance of said conduit, and means for varying the flow resistance of said conduit according to the speed of said engine.

12. In mechanism of the class described, the combination with an internal combustion engine, of an air supply means for providing air under pressure in excess of atmospheric pressure, an air conduit connecting the air supply means with the said engine, means for controlling the passage of air through the conduit arranged to supply air in quantities varying with the speed of the engine and at a relatively constant pressure, and means responsive solely to atmospheric pressures for controlling the operation of said conduit controlling means.

13. The combination, with an internal combustion engine, of a source of air under pressure greater than atmospheric pressure, a conduit for delivering air from the source to the engine, a valve device for controlling the passage of air through the conduit and operable to deliver varying quantities of air to the engine at a relatively constant pressure, motive means for operating the valve device, and atmospheric pressure responsive mechanism associated with said motive means and controlling the operation thereof.

14. The combination, with an internal combustion engine, of an air intake conduit, means associated with said conduit for propelling air therethrough driven by said engine at a constant relative speed, means operable to maintain the air supplied to said engine by said conduit at a relatively constant pressure irrespective of the speed of said engine, and mechanism to maintain the aforesaid pressure constant irrespective of varying atmospheric pressures.

In testimony whereof, I hereunto affix my signature.

GILBERT C. GOODE.